2,801,920

PREVENTION OF GEL IN FROZEN COFFEE EXTRACT

Ismar M. Reich, New York, Sutton Redfern, North White Plains, and James F. Lenney, Douglaston, N. Y., and William W. Schimmel, Dumont, N. J., assignors to Standard Brands Incorporated, New York, N. Y., a corporation of Delaware No Drawing. Application December 9, 1954, Serial No. 474,298

5 Claims. (Cl. 99—71)

This invention relates to a process for the preparation of coffee extracts. More particularly, it relates to the preparation of a relatively concentrated frozen coffee extract which is free of gelatinous material on thawing.

One of the most convenient forms in which coffee is now sold is a frozen coffee concentrate. As the name indicates, this product is a relatively concentrated extract of roasted coffee which has been frozen in order to preserve its flavor.

A difficulty accompanying the use of frozen coffee concentrates results from the fact that when thawed, they usually contain a gelatinous material. This gel is strong enough to be retained on a coarse screen as can be demonstrated readily by decanting the thawed extract through a 40 mesh screen. The amount of gel present varies greatly and may be anywhere from 0.2% to 20% by weight of the extract. One of the uses for frozen coffee concentrates is in automatic coffee vending machines. If any gel is present in the thawed concentrate it may interfere with the operation of the machines by clogging the delivery tubes.

We have found that such gels are apparently composed largely of mannan. We have found further that the formation of such gels in coffee extracts on storage in the frozen state can be prevented by treating the extracts before freezing with a mannan-hydrolyzing enzyme (mannanase) preparation. Such enzyme preparations derived from any source are suitable for carrying out our process. They may be conveniently derived, for example, from molds, for instance, from *Aspergillus niger* and *Aspergillus oryzae*. The mold is grown on a nutrient medium and the enzyme is recovered and concentrated by conventional methods such as solvent precipitation. These preparations are capable of hydrolyzing coffee gels to produce free mannose. The enzymes employed in this invention are edible and have no effect on the quality of the coffee other than to prevent gel formation during storage of the extract in the frozen condition.

As with any enzymatic process, the temperature, time of action and enzyme concentration should be controlled to get the best action from the enzymes. To speed up the action higher temperatures are preferred but the temperature should not be high enough to inactivate the enzymes. Lower temperatures may be used in which case a longer time will be required. The preferred temperature range is about 75° F. to about 150° F. The amount of enzyme used may vary greatly and may be, for instance, between 0.0001% and 2% or 3%. Using a very small amount several hours may be required at a low temperature whereas only a few minutes are required at high temperatures. If the enzyme preparation is sufficiently potent, it will be effective to prevent gel formation when it is added to the coffee extract at room temperature or below and the mixture is placed in a freezer immediately.

The invention is illustrated by the following examples in each of which the fresh coffee extract was obtained by extracting ground roasted coffee in a series of column extractors countercurrently with hot water for a time and at a temperature such that the coffee extract leaving the last extractor in the series contained 23% solids. It is to be understood that the invention is applicable to any coffee extract having a tendency to form gelatinous material on storage in a frozen condition regardless of its solids content and regardless of how it is prepared.

Example 1

A fresh coffee extract containing 23% solids was divided into two portions. To one portion there was added 0.1% (based on the weight of the extract) of a mannanase preparation derived from *Aspergillus niger*. The other portion was untreated and served as a control. Both portions were then allowed to stand at 75° F. for 24 hours in order to give the enzyme time to act. Then the samples were stored in the frozen condition for three weeks, at which time they were thawed completely by being allowed to stand at room temperature. The control sample was decanted through a 40 mesh screen and 230 grams of gel per gallon of extract were collected. The enzyme treated portion was similarly decanted and no gel whatsoever was present. The two extracts were then cup tested by a panel of trained tasters and no difference in flavor or aroma was detectable.

Example 2

A sample of fresh coffee extract at 110° F. containing 23% solids was divided into three one liter portions. One portion was treated with one gram of a mannanase preparation derived from *Aspergillus niger*. A second portion was treated with one gram of a mannanase preparation which was the same as that used in treating the first portion except for the fact that it was previously held in solution at 212° F. for 30 minutes to inactivate the enzyme. A third portion had no additions and served as a control. All three portions were heated from 110° F. to 150° F., sealed in cans, held for 5 minutes at 150° F. and then cooled quickly to 90° F. and placed in a deep freezer. After two weeks in the freezer the samples were thawed and the amount of gel present in each was measured. The portion which had been treated with active enzyme contained no gel. The portion which had been treated with heat-inactivated enzyme contained 45 grams of gel per gallon. The untreated control contained 54 grams of gel per gallon. All three samples were cup tested and judged normal in appearance, flavor and aroma. The samples were stored at 40° F. and cup tested at intervals up to 16 days. No difference in quality was found during this storage period.

Example 3

A sample of coffee extract containing 23% solids was centrifuged and obtained in a brilliant condition. A one liter portion of this sample was used as a control to which nothing was added. In a second one liter portion 0.2 gram of a mannanase preparation derived from *Aspergillus niger* was dissolved. Both portions were held for one hour at 130° F. and then for one hour at room temperature. Each portion was then frozen, allowed to stand two weeks in the frozen condition and then thawed. The portion treated with enzyme was found to be absolutely clear whereas the control portion on being centrifuged was found to contain 115 grams of wet gel.

Example 4

A centrifuged sample of fresh coffee extract containing 23% solids was divided into two one liter portions one of which was used as a control. In the other portion there was dissolved 2.0 grams of a mannanase preparation derived from *Aspergillus oryzae*. Both portions were held for one hour at 130° F. and then for one hour at room temperature, after which each portion was frozen, allowed to stand two weeks in the frozen condition and then thawed. The portion treated with enzyme was found to be perfectly clear whereas the control portion on being centrifufied was found to contain 115 grams of wet gel.

Since certain changes may be made in the above process which embodies the invention without departing from its spirit or scope it is intended that all matter contained in the above description shall be interpreted as illustrative and not in a limiting sense. It is also to be understood that the following claims are intended to cover all of the generic and specific features of the invention herein described.

We claim:

1. In a process of preparing a frozen aqueous extract of roasted coffee the step of incorporating in the extract before freezing a small amount of an enzyme preparation capable of hydrolyzing coffee gel mannan to free mannose.

2. A process as claimed in claim 1 wherein the enzyme preparation is a mannanase preparation derived from a mold.

3. A process as claimed in claim 2 wherein the mannanase preparation is derived from *Aspergillus niger*.

4. A process as claimed in claim 2 wherein the mannanase preparation is derived from *Aspergillus oryzae*.

5. Process of preventing formation of a gel in an aqueous extract of roasted coffee on storage in the frozen state which comprises mixing a mannanase preparation capable of hydrolyzing coffee gel mannan with such an extract, allowing the enzyme to act on the extract and then freezing the extract.

References Cited in the file of this patent

UNITED STATES PATENTS

| | | |
|---|---|---|
| 2,282,139 | Kellogg | May 5, 1942 |
| 2,420,615 | Palmer et al. | May 13, 1947 |

OTHER REFERENCES

Chemical Abstracts, vol. 27, 1933, p. 3229 [7].

"Enzymes," by Sumner and Kmyrback, vol. 1, parts 1 and 2, pp. 420, 553, 698, 741–743.